(12) United States Patent
Ciarafoni et al.

(10) Patent No.: US 9,303,159 B2
(45) Date of Patent: *Apr. 5, 2016

(54) PROPYLENE POLYMER COMPOSITIONS

(75) Inventors: Marco Ciarafoni, Ferrara (IT); Paola Massari, Ferrara (IT); Manikandan Rathinakumar, Dubai (AE); Gisella Biondini, Portomaggiore (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 170 days.

This patent is subject to a terminal disclaimer.

(21) Appl. No.: 13/811,618

(22) PCT Filed: Jul. 22, 2011

(86) PCT No.: PCT/EP2011/062591
§ 371 (c)(1),
(2), (4) Date: Jan. 22, 2013

(87) PCT Pub. No.: WO2012/010678
PCT Pub. Date: Jan. 26, 2012

(65) Prior Publication Data
US 2013/0123432 A1    May 16, 2013

Related U.S. Application Data

(60) Provisional application No. 61/400,178, filed on Jul. 23, 2010.

(30) Foreign Application Priority Data

Jul. 23, 2010  (EP) ...................................... 10170590

(51) Int. Cl.
C08L 23/00 (2006.01)
C08L 23/16 (2006.01)
C08L 23/12 (2006.01)

(52) U.S. Cl.
CPC ................ *C08L 23/16* (2013.01); *C08L 23/12* (2013.01); *C08L 2205/02* (2013.01); *C08L 2207/02* (2013.01); *C08L 2308/00* (2013.01)

(58) Field of Classification Search
CPC ....................................................... C08L 23/16
See application file for complete search history.

(56) References Cited

U.S. PATENT DOCUMENTS

| | | | |
|---|---|---|---|
| 4,971,937 A | 11/1990 | Albizzati et al. | |
| 5,698,642 A | 12/1997 | Govoni et al. | |
| 6,413,477 B1 | 7/2002 | Govoni et al. | |
| 7,169,871 B2 | 1/2007 | Morini et al. | |
| 7,482,406 B2 * | 1/2009 | News et al. | 525/240 |
| 7,524,903 B2 | 4/2009 | Mei et al. | |
| 7,572,860 B2 | 8/2009 | De Palo et al. | |
| 7,772,324 B2 * | 8/2010 | Massari et al. | 525/191 |
| 8,008,400 B2 * | 8/2011 | Pelliconi et al. | 525/191 |
| 8,623,932 B2 * | 1/2014 | Lunghi et al. | 521/134 |
| 2006/0235139 A1 * | 10/2006 | Garagnani et al. | 524/515 |

FOREIGN PATENT DOCUMENTS

| | | | |
|---|---|---|---|
| EP | 045977 | | 2/1982 |
| EP | 395083 | | 10/1990 |
| EP | 728769 | | 8/1996 |
| WO | WO2004087805 | * | 10/2004 |
| WO | WO2006037705 | * | 4/2006 |
| WO | WO2010069687 | * | 6/2010 |

* cited by examiner

Primary Examiner — Irina Krylova

(57) ABSTRACT

A propylene polymer composition comprising (percent by weight): A) 68%-80%, of a propylene homopolymer having a Polydispersity Index (P.I.) value of from 4.7 to 10 and MFR L (Melt Flow Rate according to ISO 1133, condition L, i.e. 230° C. and 2.16 kg load) from 10 to 30 g/10 min; B) 20%-32%, of a copolymer of propylene containing from 40.1% to 42.5% extremes included of ethylene derived units; the composition having an intrinsic viscosity of the fraction soluble in xylene at 25° C. comprised between 3 and 6 dl/g and a MFR L from 4 to 12 g/10 min. Said Propylene polymer composition being particularly suitable for injection molded articles having high rigidity and high impact properties at room and at low temperatures.

3 Claims, No Drawings

PROPYLENE POLYMER COMPOSITIONS

This application is the U.S. National Phase of PCT International Application PCT/EP2011/062591, filed Jul. 22, 2011, claiming priority of European Patent Application No. 10170590.3, filed Jul. 23, 2010 and the benefit under 35 U.S.C. 119(e) of U.S. Provisional Application No. 61/400,178, filed Jul. 23, 2010, the contents of which are incorporated herein by reference in their entirety.

The present invention relates to a propylene polymer composition having an optimum balance of properties in particular improved elongation at break and better impact strength at room temperature and at low temperatures.

As is known, the isotactic polypropylene is endowed with an exceptional combination of excellent properties which render it suitable for a very great number of uses. In order to improve said properties into the propylene stereoregular homopolymerization process have been introduced one or more copolymerization steps or one or more monomer have been introduced in the homopolymer matrix.

WO 05/014713 relates to a heterophasic polyolefin composition comprising (percent by weight):

1) 65-95% of a crystalline propylene polymer selected from propylene homopolymer and random polymer of propylene with 0.1-10% of an a-olefin selected from ethylene, a $C_4$-$C_{10}$ alpha-olefin and a mixture thereof, the said polymer being insoluble in xylene at ambient temperature in an amount over 85% and having a Polydispersity Index ranging from 4 to 13, preferably 4.5 to 12, more preferably 5 to 9, and an intrinsic viscosity value over 2.2 dl/g, preferably 2.2 to 4.5 dl/g; and 2) 5-35% of an elastomeric olefin polymer of ethylene with a $C_3$-$C_{10}$ α-olefin and optionally a diene, having an ethylene content ranging from 15 to 85% and an intrinsic viscosity value of at least 1.4 dl/g, preferably from 2.5 to 5 dl/g.

WO 2006/037705 relates to an olefin polymer composition comprising (by weight, unless otherwise specified):

A) 60-85%, preferably 65-80%, more preferably 65-75%, of a crystalline propylene homopolymer or a crystalline copolymer of propylene containing 3% or less of ethylene or $C_4$-$C_{10}$ α-olefin(s) or of combinations thereof, said homopolymer or copolymer having a Polydispersity Index (P.I.) value of from 4.5-6, preferably 4.5-5.5, and a content of isotactic pentads (mmmm), measured by $^{13}$C NMR on the fraction insoluble in xylene at 25° C., higher than 96%, preferably higher than 98%;

B) 15-40%, preferably 20-35%, more preferably 25-35%, of a partially amorphous copolymer of ethylene containing from 34.5% to 70.0%, preferably from 35.0% to 50.0%, more preferably from 35.0% to 40.0%, even more preferably of propylene or $C_4$-$C_{10}$ alpha-olefin(s) or of combinations thereof, and optionally minor proportions of a diene.

The above composition has alleged good impact properties and good elongation at break properties.

The applicant found a specific class of propylene polymer composition able to show much better mechanical properties in terms of elongation at break and impact resistance at room temperature as much as at low temperatures.

The object of the present invention is a propylene composition comprising (percent by weight):

A) 68%-80%, preferably 70%-80%, more preferably 71%-78%, of a propylene homopolymer having a Polydispersity Index (P.I.) value of from 4.7 to 10, preferably from 5.1 to 10, even more preferably from 5.6 to 9; and a MFR L (Melt Flow Rate according to ISO 1133, condition L, i.e. 230° C. and 2.16 kg load) from 10 to 30 g/10 min, in particular from 12 to 25 g/10 min; and B) 20%-32%, preferably 20%-30%, more preferably 22-29% of a copolymer of propylene with from 40.1% to 42.5% extremes included of ethylene derived units;

the composition having an intrinsic viscosity of the fraction soluble in xylene at 25° C. comprised between 3.0 and 6.0 dl/g; preferably between 3.5 and 5 dl/g, more preferably between 3.6 and 4 dl/g.

From the above definitions it is evident that the term "copolymer" includes polymers containing only two kinds of comonomers.

Preferably the propylene homopolymer A) has a molecular weight distribution of multimodal type, more preferably of bimodal type.

With the term "molecular weight distribution of multimodal type" is meant that the molecular weight distribution curve obtained by GPC shows more than one maximum value or a single maximum value and one or more inflexion points.

Other preferred features for the compositions of the present invention are:

MFR L (Melt Flow Rate according to ISO 1133, condition L, i.e. 230° C. and 2.16 kg load) from 4 to 12 g/10 min, in particular from 4 to 10 g/10 min.; more preferably from 4 to 9 g/10 min.

Moreover, the compositions of the present invention preferably are endowed with some or all these properties:

a Flexural Modulus is comprised between 900 MPa and 2000 MPa; preferably from 1000 MPa to 1500 MPa; even more preferably from 1050 MPa to 1300 MPa;

Izod impact strength measured at 23° C. higher than 40 kJ/m$^2$, preferably comprised between 45 and 60 kJ/m$^2$; more preferably between 50 and 60 kJ/m$^2$;

Izod impact strength measured at 0° C. higher than 10 kJ/m$^2$, preferably comprised between 15 and 50 kJ/m$^2$; more preferably between 25 and 40 kJ/m$^2$;

Izod impact strength measured at −20° C. higher than 5 kJ/m$^2$, preferably comprised between 8 and 30 kJ/m$^2$; more preferably between 10 and 30 kJ/m$^2$;

a value of elongation at break ranging from 150 to 700%, preferably 200-600%, more preferably from 400 to 600% according to ISO method 527.

With the composition of the present invention it is possible to achieve an optimum balance of properties, in particular the values of the Izod Impact strength measured at room and low temperatures are particularly high.

The propylene polymer compositions of the present invention can be prepared by sequential polymerization in at least two stages, with each subsequent polymerization stage being conducted in the presence of the polymeric material formed in the immediately preceding polymerization reaction, wherein the copolymer (A) is normally prepared in at least one first polymerization stage and the copolymer (B) is normally prepared in at least one second polymerization stage.

Preferably, each polymerization stage is carried out in presence of a highly stereospecific heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00163261.

Preferably, the solid catalyst component comprises Mg, Ti, halogen and an electron donor selected from succinates of formula (I):

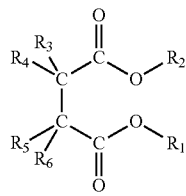

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the periodic table; the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms, and the radicals $R^3$ to $R^6$ which are joined to the same carbon atom can be linked together to form a cycle.

$R^1$ and $R^2$ are preferably $C_1$-$C_8$ alkyl, cycloalkyl, aryl, arylalkyl and alkylaryl groups.

Particularly preferred are the compounds in which $R^1$ and $R^2$ are selected from primary alkyls and in particular branched primary alkyls. Examples of suitable $R^1$ and $R^2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R^3$ to $R^5$ are hydrogen and $R^6$ is a branched alkyl, cycloalkyl, aryl, arylalkyl and alkylaryl radical having from 3 to 10 carbon atoms. Another preferred group of compounds within those of formula (I) is that in which at least two radicals from $R^3$ to $R^6$ are different from hydrogen and are selected from $C_1$-$C_{20}$ linear or branched alkyl, alkenyl, cycloalkyl, aryl, arylalkyl or alkylaryl group, optionally containing heteroatoms belonging to groups.

Particularly preferred are the compounds in which the two radicals different from hydrogen are linked to the same carbon atom. Furthermore, also the compounds in which at least two radicals different from hydrogen are linked to different carbon atoms, that is $R^3$ and $R^5$ or $R^4$ and $R^6$ are particularly preferred.

According to a preferred method, the solid catalyst component can be prepared by reacting a titanium compound of formula $Ti(OR)_{n-y}X_y$ where n is the valence of titanium and y is a number between 1 and n, preferably TiC4, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with Tic4 can be carried out one or more times. The internal donor can be added during the treatment with $TiCl_4$ and the treatment with the electron donor compound can be repeated one or more times. Generally, the succinate of formula (I) is used in molar ratio with respect to the MgCl2 of from 0.01 to 1 preferably from 0.05 to 0.5. The preparation of catalyst components in spherical form is described for example in European patent application EP-A-395083 and in the International patent application WO98144001. The solid catalyst components obtained according to the above method show a surface area (by B.E.T. method) generally between 20 and 500 m 21 g and preferably between 50 and 400 m 21 g, and a total porosity (by B.E.T. method) higher than 0.2 cm 31 g preferably between 0.2 and 0.6 cm 31 g. The porosity (Hg method) due to pores with radius up to 10.000 A generally ranges from 0.3 to 1.5 cm 31 g, preferably from 0.45 to 1 cm 31 g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1, trifluoropropyl-2-ethylpiperidinyl-dimethoxysilane and 1,1,1, trifluoropropyl-metildimethoxysilane. The external electron donor compound is used in such an amount to give a molar ratio between the organo-aluminum compound and said electron donor compound of from 0.1 to 500.

The polymerization process can be carried out in gas phase and or in liquid phase, in continuous or batch reactors, such as fluidized bed or slurry reactors. For example, it is possible to carry out the polymerization of the propylene polymer (A) in liquid phase, using liquid propylene as diluent, while the copolymerization stage to obtain the propylene copolymer fraction (B) is carried out in gas phase, without intermediate stages except for the partial degassing of the monomers. Alternatively, all the sequential polymerization stages can be carried out in gas phase. The reaction time, temperature and pressure of the polymerization steps are not critical, however the temperature for the preparation of fraction (A) and (B), that can be the same or different, is usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene polymer composition is regulated by using known regulators, such as hydrogen.

According to a preferred embodiment, the propylene polymer (A) is produced by a gas-phase polymerization process carried out in at least two interconnected polymerization zones. Said polymerization process is described in the European patent EP 782587.

The process is carried out in a first and in a second interconnected polymerization zone to which propylene and ethylene or propylene and alpha-olefins are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C. The process can be carried out under operating pressure of between 0.5 and 10 MPa, preferably between 1.5 and 6 MPa. Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer.

In the second stage of the particularly preferred polymerization process, the propylene/ethylene copolymer (B) is produced in a conventional fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor operating under conventional conditions of temperature and pressure.

The propylene polymer compositions of the present invention can also be obtained by separately preparing the said copolymers (A) and (B), operating with the same catalysts and substantially under the same polymerization conditions as previously illustrated and subsequently mechanically blending said copolymers in the molten state using conventional mixing apparatuses, like twin-screw extruders.

The propylene polymer compositions of the present invention may further comprise additives commonly employed in the polyolefin field, such as antioxidants, light stabilizers, nucleating agents, antiacids, colorants and fillers.

The main application of the propylene polymer compositions of the invention is the production of molded articles, particularly injection-molded items. The injection-molded articles comprising the propylene polymer compositions of the invention have high values of Flexural modulus combined with good impact properties and particularly high elongation at break.

The following examples are given to illustrate and not to limit the present invention.

EXAMPLES

The data of the propylene polymer materials were obtained according to the following methods:

Xylene-Soluble Faction 2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25OC for 30 minutes as well. The solid thus obtained is filtered on quick filtering paper and the filtered liquid is divided into two 100 ml aliquots. One 100 ml aliquots of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Ethylene (C2) Content

By IR spectroscopy.

The comonomer content of the Component B is determined on the precipitated "amorphous" fraction of the polymer. The precipitated "amorphous" fraction is obtained as follows: to one 100 ml aliquot of the filtered liquid obtained as described above (procedure for the Xylene-soluble faction) 200 ml of acetone are added under vigorous stirring. Precipitation must be complete as evidenced by a clear solid-solution separation. The solid thus obtained is filtered on a tared metallic screen and dried in a vacuum oven at 70° C. until a constant weight is reached.

Molar Ratio of Feed Gasses

Determined by gas-chromatography

Melt Flow Rate (MFR)

Determined according to ISO 1133 (230° C., 2.16 Kg)

Intrinsic Viscosity

Determined in tetrahydronaphthalene at 135° C.

Flexural Modulus

Determined according to ISO 178

Elongation at Yield and Break

Determined according to ISO 527

IZOD Impact Strength

Determined according to ISO 18011A

Polydispersity Index (PI): measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

MS=(frequency at G'=500 Pa)/(frequency at G"=500 Pa)

wherein G' is the storage modulus and G" is the loss modulus.

Example 1 and Comparative Example 1

The Ziegler-Natta catalyst was prepared according to the Example 5, lines 48-55 of the European Patent EP728769. Triethylaluminium (TEAL) was used as co-catalyst and dicyclopentyldimethoxysilane as external donor.

The propylene polymer compositions of the examples were prepared in a two-step polymerization process, wherein the copolymer (A) was prepared in the first polymerization step by feeding the monomers and the catalyst system to a gas-phase polymerization reactor comprising two interconnected polymerization zones, a riser and a downcomer, as described in the European Patent EP782587. Example 1 was carried by using the "barrier feed" of liquid propylene according to the description of EP1012195, in order to differentiate the hydrogen concentration between the riser and the downcomer and obtain a distribution of molecular weight of bimodal type. Comparative example 1 has been carried our without using the "barrier feed" of liquid propylene.

The polymerization mixture was discharged from said reactor, conveyed to a gas-solid separator and the polymerized material was sent into a conventional gas-phase fluidized-bed reactor where the propylene-ethylene copolymer (B) was produced. The operative conditions are indicated in Table 1.

The polymer particles exiting from the second polymerization step were subjected to a steam treatment to remove the unreacted monomers and dried.

The propylene polymer compositions were added with the following additives GMS—0.1%, Irganox 1010—0.05%, Irgafos 168—0.05%, DSTDP—0.21% and Sodium Benzoate NaBz—0.09% and extruded in a twin-screw extruder Berstorff (L/D=33) under the following operating conditions:
Temperature of the feeding section: 190-210° C.
Melt temperature: 240° C.
Temperature of the die section: 230° C.
Flow rate: 16 Kg/h
Rotational speed: 250 rpm

TABLE 1

| Example | | 1 | Comp 1 |
|---|---|---|---|
| Component A) | | | |
| TEAL/external donor | wt/wt | 8 | 7 |
| TEAL/catalyst | wt/wt | 6 | 6 |
| Temperature | ° C. | 80 | 75 |
| Pressure | bar-g | 28 | 27 |
| Split holdup riser | wt % | 40 | 40 |
| downcomer | wt % | 60 | 60 |
| $H_2/C_3^-$ riser | mol/mol | 0.21 | 0.045 |
| $H_2/C_3^-$ downcomer | mol/mol | 0.005 | 0.045 |
| Component B (gas phase reactor) | | | |
| Temperature | ° C. | 80 | 80 |
| Pressure | MPa | 1.9 | 1.6 |
| Split * | % | 25 | 23 |

TABLE 1-continued

| Example | | 1 | Comp 1 |
|---|---|---|---|
| $C_2^-/C_2^- + C_3^-$ | mol/mol | 0.20 | 0.22 |
| $H_2/C_2^-$ | mol/mol | 0.09 | 0.013 |

* Amount of component B with respect to A + B
$C_2^-$ = ethylene
$C_3^-$ = propylene Comparative Example 2

The propylene polymer composition of the comparative example 2 is the composition according to the example 1 of WO 2006/037705.

The properties of the compositions obtained according to Example 1 and Comparative Examples 1-2 are reported in table 2

TABLE 2

| Example | | 1 | Comp ex 1 | Comp ex 2 |
|---|---|---|---|---|
| MFR of the component A) | g/10' | 25 | 32 | 72 |
| Polydispersity Index | | 5.7 | 4.3 | 5.4 |
| % copolymer component B) | wt % | 25 | 23 | 30 |
| % $C_2^-$ component B) | wt % | 40.5 | 38 | 43 |
| MFR of the composition | g/10' | 7.0 | 11.6 | 13 |
| XSIV | dl/g | 3.7 | 3.4 | 3.05 |
| Flexural Modulus | MPa | 1100 | 1100 | 1010 |
| Izod Impact 23° C. | kJ/m2 | 52.0 | 42.1 | 49.2 |
| Izod Impact 0° C. | kJ/m2 | 31.0 | 10 | 10.3 |
| Izod Impact −20° C. | kJ/m2 | 11.3 | 8.2 | 9.2 |
| Elongation at break | % | 573 | 425 | 378 |

$C_2^-$ = ethylene

By comparing example 1 of the present invention with comparative examples 1 and 2 it is clear that, when the parameters of the present invention are fulfilled, the Izod Impact strength is improved at room temperatures and at low temperatures without any decrease in rigidity properties.

The invention claimed is:

1. A propylene polymer composition comprising (percent by weight):
   A) 68%-80%, of a propylene homopolymer having a Polydispersity Index (P.I.) value of from 4.7 to 10 and MFR L (Melt Flow Rate according to ISO 1133, condition I, i.e. 230° C. and 216 kg load) from 12 to 25 g/10 min;
   B) 20%-32%, of a copolymer of propylene containing from 40.1% to 42.5% extremes included of ethylene derived units;
   the propylene polymer composition having:
   (i) an intrinsic viscosity of the fraction soluble in xylene at 25° C. between 3 and 6 dl/g,
   (ii) an Izod impact strength measured at 23° C. from between 50 and 60 kJ/m$^2$,
   (iii) an Izod impact strength measured at 0° C. between 25 and 40 kJ/m$^2$,
   (iv) an Izod impact strength measured at −20° C. between 10 and 30 kJ/m$^2$,
   (v) a flexural modulus between 900 and 1300 MPa, and
   (vi) a MFR L from 4 to 12 g/10 min.

2. The composition according to claim 1 wherein component A) has a polydispersity Index (P.I.) value of from 5 to 10.

3. The composition according to claim 1 having an intrinsic viscosity of the fraction soluble in xylene at 25° C. comprised between 3.5 and 5.0 dl/g.

* * * * *